United States Patent
Kubo et al.

(10) Patent No.: US 9,477,366 B2
(45) Date of Patent: Oct. 25, 2016

(54) DISPLAY DEVICE

(71) Applicant: Japan Display Inc., Tokyo (JP)

(72) Inventors: Masaki Kubo, Chiba (JP); Shigeyuki Nishitani, Mobara (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/096,396

(22) Filed: Apr. 12, 2016

(65) Prior Publication Data

US 2016/0224161 A1    Aug. 4, 2016

Related U.S. Application Data

(63) Continuation of application No. 14/700,607, filed on Apr. 30, 2015, now Pat. No. 9,335,879, which is a continuation of application No. 13/348,680, filed on Jan. 12, 2012, now Pat. No. 9,052,757.

(30) Foreign Application Priority Data

Jan. 18, 2011   (JP) ................. 2011-007840

(51) Int. Cl.
*G06F 3/045* (2006.01)
*G06F 3/044* (2006.01)
*G06F 3/041* (2006.01)

(52) U.S. Cl.
CPC .......... *G06F 3/044* (2013.01); *G06F 3/0412* (2013.01); *G06F 2203/04103* (2013.01); *G06F 2203/04107* (2013.01)

(58) Field of Classification Search
CPC ....... G06F 3/044; G06F 3/045; G06F 3/0412
USPC ....... 345/173–179; 178/18.01–18.04; 349/56
See application file for complete search history.

(56) References Cited

U.S. PATENT DOCUMENTS

| | | | |
|---|---|---|---|
| 5,589,856 A | 12/1996 | Stein et al. | |
| 8,416,207 B2 * | 4/2013 | Kasajima | G06F 3/0412 178/18.01 |
| 8,564,556 B2 * | 10/2013 | Lee | G02F 1/13338 345/173 |
| 8,599,173 B2 | 12/2013 | Soo et al. | |

(Continued)

FOREIGN PATENT DOCUMENTS

| | | |
|---|---|---|
| JP | H07-110742 A | 4/1995 |
| JP | H11-327756 A1 | 11/1999 |

(Continued)

OTHER PUBLICATIONS

Office Action mailed by Japanese Patent Office on Jan. 20, 2015 regarding a counterpart Japanese patent application No. 2013-251455.

*Primary Examiner* — Kimnhung Nguyen
(74) *Attorney, Agent, or Firm* — Typha IP LLC

(57) ABSTRACT

A display device which can achieve compatibility between the simplicity of the configuration or control of electronic equipment and the maintaining of its high operability includes: a display panel and a touch panel arranged on a front surface side of the display panel as viewed from a viewer. The touch panel includes one transparent substrate and a conductive pattern disposed on the substrate. A plurality of detection areas in each of which a touch position can be detected are provided in the touch panel. A non-detection area in which the touch position is not detected is provided between two detection areas next to each other.

9 Claims, 6 Drawing Sheets

(56) References Cited

U.S. PATENT DOCUMENTS

| | | | |
|---|---|---|---|
| 8,648,833 B2 * | 2/2014 | Lee | G06F 3/045 345/173 |
| 8,674,950 B2 * | 3/2014 | Olson | G06F 3/044 178/18.01 |
| 8,692,795 B1 | 4/2014 | Kremin et al. | |
| 8,730,184 B2 * | 5/2014 | Nirmal | G06F 3/044 178/18.01 |
| 2005/0052429 A1 | 3/2005 | Philipp | |
| 2007/0296694 A1 | 12/2007 | Kim et al. | |
| 2008/0225015 A1 | 9/2008 | Hashida | |
| 2008/0309635 A1 | 12/2008 | Matsuo | |
| 2009/0117944 A1 | 5/2009 | Lee et al. | |
| 2009/0266624 A1 * | 10/2009 | Kondoh | G06F 3/045 345/174 |
| 2010/0253646 A1 * | 10/2010 | Hiratsuka | G06F 3/044 345/174 |
| 2010/0328254 A1 * | 12/2010 | Niga | G06F 3/044 345/174 |
| 2011/0018826 A1 * | 1/2011 | Shoji | G06F 3/044 345/173 |
| 2011/0050624 A1 * | 3/2011 | Lee | G06F 3/045 345/174 |
| 2011/0139516 A1 | 6/2011 | Nirmal et al. | |
| 2011/0248838 A1 | 10/2011 | Krahenbuhl | |
| 2011/0267301 A1 | 11/2011 | Shimizu et al. | |
| 2011/0298746 A1 | 12/2011 | Hotelling | |
| 2012/0044193 A1 | 2/2012 | Peng et al. | |
| 2012/0092270 A1 | 4/2012 | Lyon et al. | |
| 2012/0146930 A1 | 6/2012 | Lee | |

FOREIGN PATENT DOCUMENTS

| | | |
|---|---|---|
| JP | 2004-333302 A | 11/2004 |
| JP | 2008-225821 A | 9/2008 |
| JP | 2008-310550 A | 12/2008 |
| JP | 2009-48559 A | 3/2009 |
| JP | 2009-116861 A | 5/2009 |
| JP | 2010-44435 A | 2/2010 |
| JP | 2010-244357 A | 10/2010 |

* cited by examiner

DISPLAY DEVICE

CROSS-REFERENCE TO RELATED APPLICATION

This application is a continuation of U.S. patent application Ser. No. 14/700,607, filed on Apr. 30, 2015, which, in turn, is a continuation of U.S. patent application Ser. No. 13/348,680, (now U.S. Pat. No. 9,052,757), filed on Jan. 12, 2012. Further, this application claims priority from Japanese application JP 2011-007840 filed on Jan. 18, 2011, the entire contents of which are hereby incorporated by reference into this application.

BACKGROUND OF THE INVENTION

1. Field of the Invention

The present invention relates to a display device, and more particularly, to a technique effectively applied to a liquid crystal display device having a touch panel arranged on a liquid crystal display panel.

2. Description of the Related Art

Examples of display devices in the related art include a display device having a man-machine interface called a touch panel arranged on a display panel (hereinafter referred to as display device with a touch panel). The display device with the touch panel is being widely used for, for example, bank s ATMs (Automatic Teller Machines), car navigation systems, mobile-phone handsets, and the like.

The touch panel is generally disposed such that an area thereof (hereinafter referred to as detection area) in which a touch position can be detected when touched with predetermined means (for example, a finger, a stylus, and the like) overlaps a display area in a display panel. Therefore, a user can operate electronic equipment having the display device with the touch panel as if, for example, the user directly touches an image, such as of a button, displayed on the display panel.

In the display device with the touch panel, all or part of operation of electronic equipment having the display device can be replaced with a combination of an image or video to be displayed on the display panel and a touch position on the touch panel. Accordingly, by using the display device with the touch panel, the configuration or control of the electronic equipment can be simplified compared to electronic equipment operated using mechanical switches, such as membrane switches, in the related art.

Further, examples of display devices with a touch panel in recent years include a display device in which, for example, a sheet provided with a part serving as a mark in operation, such as a button, is arranged on a front surface of a touch panel for improving operability of electronic equipment having the display device (for example, refer to JP 11-327756 A).

SUMMARY OF THE INVENTION

In electronic equipment having a display device with a touch panel in the related art, for example, mechanical switches, such as membrane switches, are arranged outside a display area, and an operation relating to a frequently used function or a specific operation is assigned to the mechanical switch in some cases. By doing this, for example, invoking of a frequently used function or a specific operation can be directly performed irrespective of contents displayed on a display panel, improving operability.

However, when the mechanical switch is arranged, there arises a problem that the configuration or control of the electronic equipment is complicated by the amount corresponding to the arrangement.

Moreover, when the mechanical switch is arranged, a space for arranging the switch is needed outside the display area. Therefore, there arises a problem that the electronic equipment is increased in size or the display area is narrowed.

Further, a pattern, such as a button or a concavity and convexity, provided in the sheet in JP 11-327756 A varies depending on, for example, operations performed using the touch panel, in other words, depending on the kinds of electronic equipment. Accordingly, it is conceivable that the use of such a sheet leads to a reduction in general versatility of a display device with touch panel.

It is an object of the invention to provide a display device with a touch panel which can, for example, achieve compatibility between the simplicity of the configuration or control of electronic equipment and the maintaining of its high operability.

It is another object of the invention to provide a display device with a touch panel which can, for example, suppress a reduction in general versatility when being incorporated into electronic equipment.

The above and other objects and novel features of the invention will become apparent from the description of the specification and the accompanying drawings.

A typical outline of the invention disclosed herein will be described below.

(1) A display device includes: a display panel; and a touch panel arranged on a front surface side of the display panel as viewed from a viewer, wherein the touch panel includes one transparent substrate and a conductive pattern disposed on the substrate, a plurality of detection areas in each of which a touch position can be detected are provided the touch panel, and a non-detection area in which the touch position is not detected is provided between two detection areas next to each other.

(2) In the display device according to (1), in all the plurality of detection areas, the same detection system of the touch position is adopted.

(3) In the display device according to (2), the detection system is an electrostatic capacitive coupling system.

(4) In the display device according to (3), in each of the plurality of detection areas, a first electrode and a second electrode for generating an electric field are arranged on a surface of the detection area, the planar shape and arrangement rule of the first electrode and the second electrode are the same in two detection areas of the plurality of detection areas, and the first electrodes are electrically connected to each other or the second electrodes are electrically connected to each other.

(5) In the display device according to (3), the touch panel is provided with a detection area in which a plurality of first electrodes and a plurality of second electrodes for generating an electric field are disposed together on a surface of the detection area and a detection area in which one first electrode and one second electrode for generating an electric field are disposed.

(6) In the display device according to (1), there are two or more detection systems of the touch position in the plurality of detection areas.

(7) In the display device according to (1), the touch panel is provided with a detection area overlapping a display area in the display panel and a detection area not overlapping the display area.

(8) In the display device according to (7), a light source emitting light to the viewer side through the detection area not overlapping the display area is arranged behind the detection area as viewed from the viewer.

(9) In the display device according to (1), the touch panel has an external connection terminal for inputting and outputting electric signals, and the external connection terminal is disposed in the non-detection area located between two detection areas next to each other.

(10) In the display device according to (1), on a front surface of the touch panel, a front window having a transparent substrate and a light-shielding film which has openings at positions overlapping two or more detection areas of the plurality of detection areas is arranged.

By using the display device according to the invention, it is possible to achieve compatibility between the simplicity of the configuration or control of electronic equipment having the display device with the touch panel and the maintaining of its high operability.

Moreover, the display device according to the invention has high general versatility when being incorporated into electronic equipment.

DETAILED DESCRIPTION OF THE INVENTION

Figure 1:
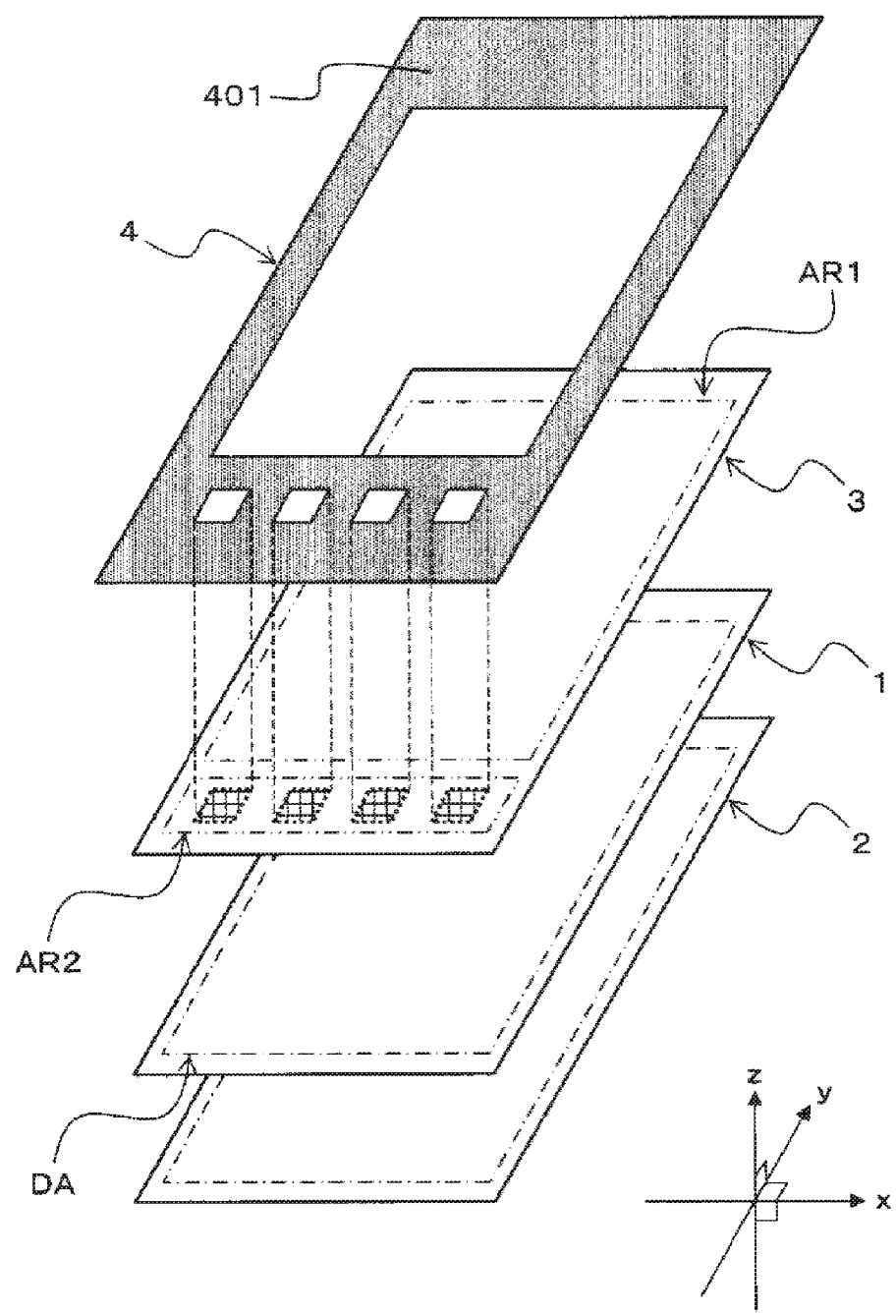
FIG. 1 is a schematic exploded perspective view showing an example of a main portion in a display device with a touch panel of a first embodiment.

Hereinafter, the invention will be described in detail together with embodiments with reference to the drawings.

Throughout the drawings for describing the embodiments, constituents having the same function are denoted by the same reference numerals and signs, and the repetitive description thereof is omitted.

First Embodiment

Figure 2:
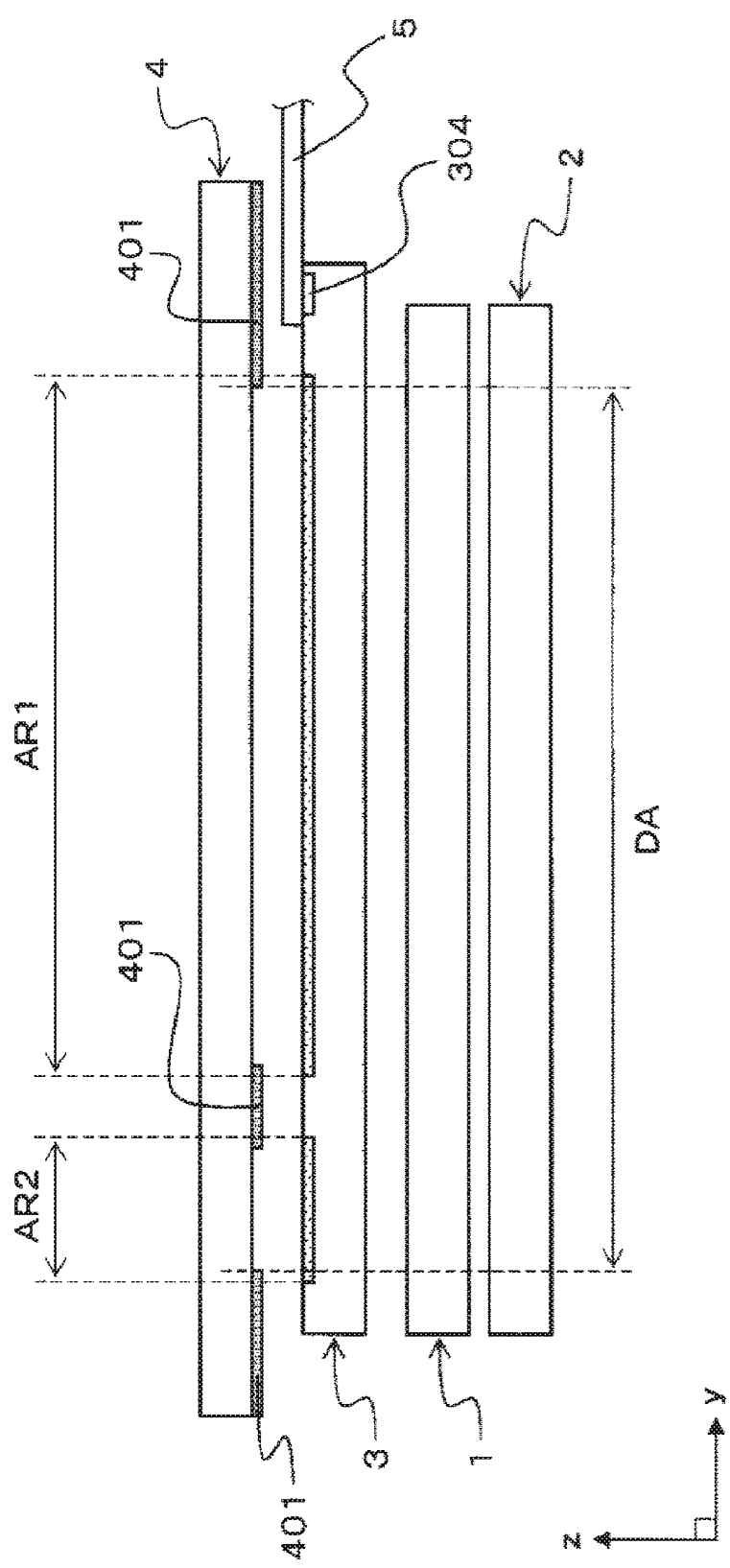
FIG. 2 is a schematic side view of the display device with the touch panel shown in FIG. 1.
Figure 3:
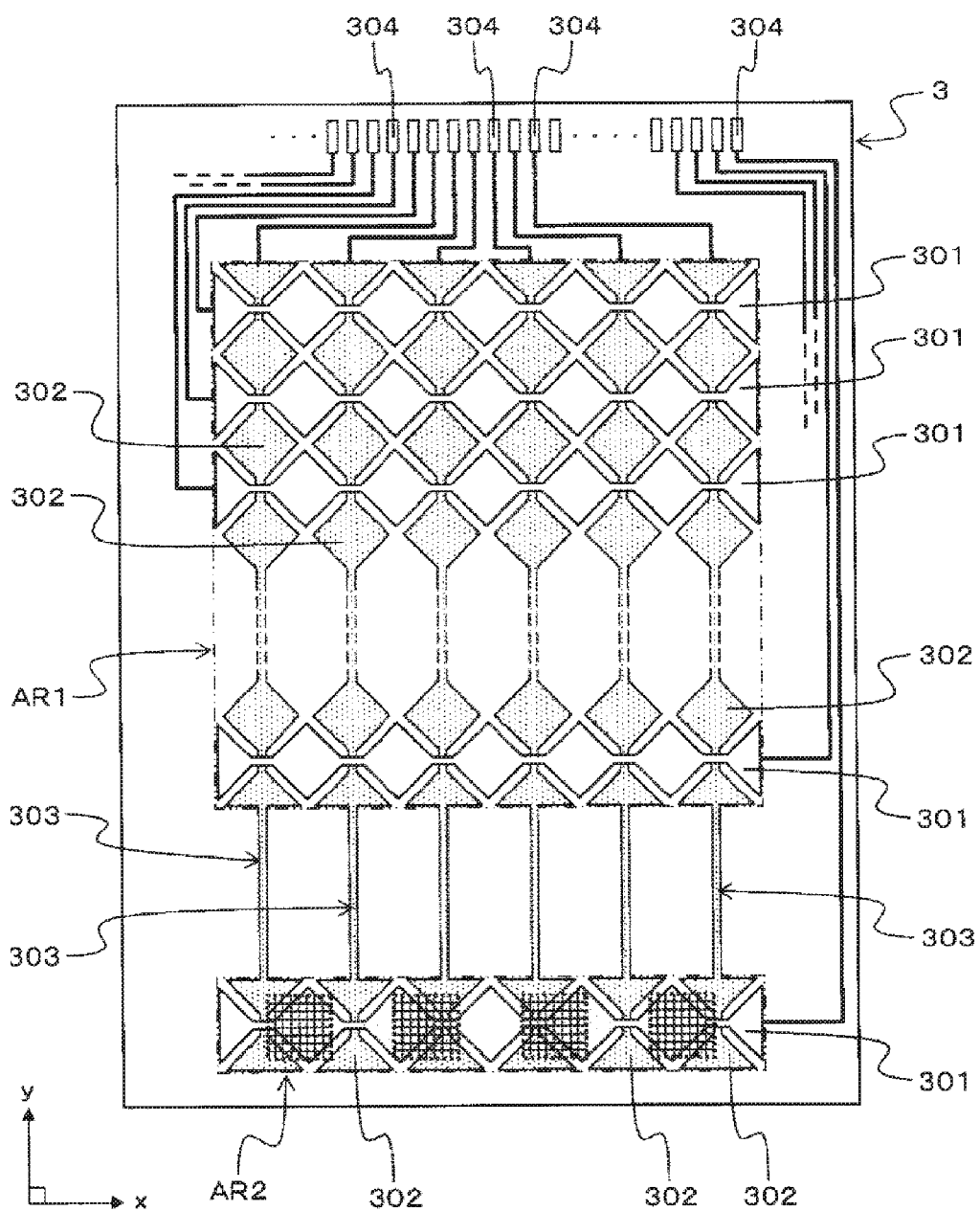
FIG. 3 is a schematic plan view showing an example of a touch panel in the display device with the touch panel of the first embodiment.

FIGS. 1 to 3 are schematic views showing a schematic configuration of a display device with a touch panel of a first embodiment according to the invention.

FIG. 1 is a schematic exploded perspective view showing an example of a main portion in the display device with the touch panel of the first embodiment. FIG. 2 is a schematic side view of the display device with the touch panel shown in FIG. 1. FIG. 3 is a schematic plan view showing an example of a touch panel in the display device with the touch panel of the first embodiment.

FIG. 2 shows a side view along the yz plane in an xyz orthogonal coordinate system shown in FIG. 1. FIG. 3 is a plan view along the xy plane in the xyz orthogonal coordinate system shown in FIG. 1. In the xyz orthogonal coordinate system shown in FIG. 1, the xy plane is parallel with a display surface (display area) in a display panel, and a viewer observes the display device mainly from the +z-axis direction side.

In the first embodiment, a liquid crystal display device having a touch panel combined therewith is taken as an example of a display device with a touch panel according to the invention. In this case, the display device has, for example as shown FIGS. 1 and 2, a liquid crystal display panel 1, a backlight 2, a touch panel 3, a front window 4, and a printed-wiring board 5.

The liquid crystal display panel 1 may be one of a so-called transmissive liquid crystal display panel or a so-called semi-transmissive liquid crystal display panel in the related art. Therefore, in the specification, a specific description of the configuration of the liquid crystal display panel 1 is omitted.

The backlight 2 arranged on a rear side of the liquid crystal display panel 1 as viewed from the viewer may be, for example, any one of backlights used for liquid crystal display devices in the related art. Therefore, in the specification, a specific description of the configuration of the backlight 2 is omitted.

The touch panel 3 arranged on a front surface side of the liquid crystal display panel 1 as viewed from the viewer has a basic configuration similar to that of the related art and has one transparent substrate and a conductive pattern disposed on the substrate. However, the touch panel 3 of the first embodiment has, for example as shown in FIGS. 1 to 3, two detection areas, i.e., a first detection area AR1 and a second detection area AR2 in one touch panel 3. Also the touch panel 3 has a non-detection area between the two detection areas AR1 and AR2. The detection area is an area in which a touch position can be detected when touched with predetermined means (for example, a finger, a stylus, and the like), while the non-detection area is an area in which a touch position cannot be detected.

In the touch panel 3 of the first embodiment, a detection system of a touch position is an electrostatic capacitive coupling system (also referred to as electrostatic capacitive system or analog capacitive coupling system), and in each of the first detection area AR1 and the second detection area AR2, first electrodes 301 and second electrodes 302 for generating an electric field on a surface of the detection area are arranged.

In this case, one first electrode 301 is composed of a plurality of rhombus-shaped electrode portions and a plurality of triangle-shaped electrode portions both of which are arranged in a first direction (x-axis direction) and connecting portions which connect (couple) them. Similarly, one second electrode 302 is composed of a plurality of rhombus-shaped electrode portions and a plurality of triangle-shaped electrode portions (or only triangle-shaped electrode portions) both of which are arranged in a second direction (y-axis direction) and connecting portions which connect them.

A specific configuration example (the arrangement rule of the first electrode and the second electrode, and the like) and a manufacturing method of a touch panel in which the first electrode and the second electrode having such a planar shape are arranged in the detection area are disclosed in, for example, JP 2010-044435 A and JP 2008-310550 A. Moreover, the detection system of a touch position in the touch panel 3 according to the invention is not limited to the electrostatic capacitive coupling system but can be appropriately selected. Therefore, in the specification, a description of the specific configuration or detection principle of the touch panel 3 is omitted.

In the touch panel 3 according to the invention as described above, two kinds of detection areas, i.e., the first detection area AR1 and the second detection area AR2 are disposed, and the non-detection area is located between the two kinds of detection areas AR1 and AR2. In this case, an external connection terminal which inputs and outputs electric signals for detecting a touch position in the first detection area AR1 and an external connection terminal which inputs and outputs electric signals for detecting a touch position in the second detection area AR2 may be independent of each other.

However, in the touch panel 3 of the first embodiment as shown in FIG. 3 for example, the second electrode 302 in the first detection area AR1 and the second electrode 302 in the second detection area AR2 are electrically connected through an extended wire 303 to serve as a common electrode. Also in this case, it is so configured that the first electrode 301 in the second detection area AR2 is independent of the first electrode 301 in the first detection area AR1, whereby electric signals are input and output from different external connection terminals 304. By doing this, it is possible to reduce the numbers of the external connection terminals 304 and the wires to as few as possible, making it possible to suppress an increase in area of the touch panel 3.

It is desirable that, for example as shown in FIGS. 1 to 3, one detection area (the second detection area AR2) of the two detection areas disposed in the touch panel 3 be made small and disposed at an edge of a display area DA in the liquid crystal display panel 1. By doing this, the second detection area AR2 can be used for an operation button for, for example, an operation relating to a frequently used function or a specific operation. Therefore, by displaying, for example, main information in an area overlapping the first detection area AR1 out of the display area DA of the liquid crystal display panel 1 and displaying the button for invoking a frequently used function or performing a specific operation in an area overlapping the second detection area AR2, the invoking of a frequently used function or the specific operation can be directly performed from any state, improving operability.

In this case, the invoking of a frequently used function or the specific operation is performed by touching the touch panel 3. Accordingly, compared to, for example, a display device with a touch panel in the related art in which mechanical switches, such as membrane switches, are arranged around the display area DA, the configuration or control is simplified.

Moreover, when a plurality of operation buttons are disposed in the second detection area AR2 in the touch panel 3, a light-shielding film 401 having an opening at an area overlapping the first detection area AR1 and openings at areas to be used as the operation buttons in the second detection area AR2 is disposed on the front window 4 arranged on the front surface side of the touch panel 3 as viewed from the viewer as shown in FIGS. 1 and 2 for example, whereby the positions of the operation buttons can be easily recognized.

That is, by incorporating the display device with the touch panel of the first embodiment into electronic equipment, it is possible to achieve compatibility between the simplicity of the configuration or control of the electronic equipment and the maintaining of its high operability.

When the operation buttons are disposed in the second detection area AR2, it is sufficient that the presence or absence of touch in an area functioning as each of the operation buttons can be detected in the second detection area AR2, and therefore, the area of the first electrode 301 and the second electrode 302 to be arranged can be reduced. Therefore, compared to a display device with a touch panel in the related art in which mechanical switches, such as membrane switches, are arranged around the display area DA, narrowing the frame (reducing the area) can be easily achieved.

In the electronic equipment having the display device with the touch panel of the first embodiment incorporated therein, the operation contents corresponding to the operation buttons in the second detection area can be changed by means of software. Moreover, the positional relation between the first detection area AR1 and the second detection area AR2 is not limited the positional relation shown in FIG. 3 but can be changed appropriately. Further, the position, planar shape, number, and the like of the detection area to be disposed for use as an operation button, like the second detection area AR2, can be changed appropriately. For example, the detection area can be disposed at each of the corners of the first detection area AR1 or can be disposed so as to surround the first detection area AR1. When a number of detection areas for operation buttons are disposed, the area functioning as the operation button can be changed by, for example, changing the wiring of the printed-wiring board 5 to be connected to the touch panel 3 or the pattern of the light-shielding film 401 disposed on the front window 4. Therefore, in the display device with the touch panel of the first embodiment, it is possible to suppress a reduction in general versatility when being incorporated into electronic equipment.

Second Embodiment

Figure 4:
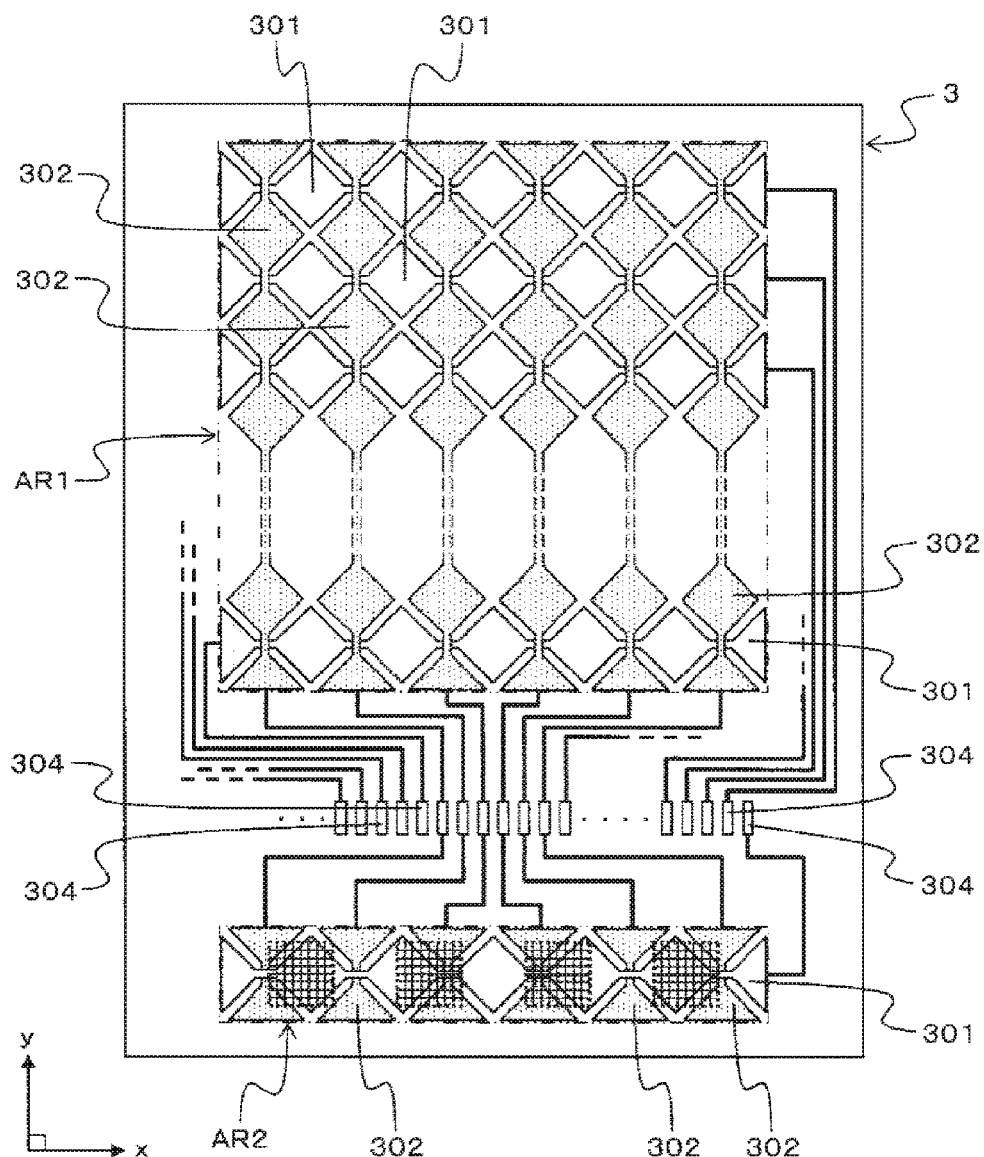
FIG. 4 is a schematic plan view showing an example of a touch panel in a display device with a touch panel of a second embodiment.
Figure 5:
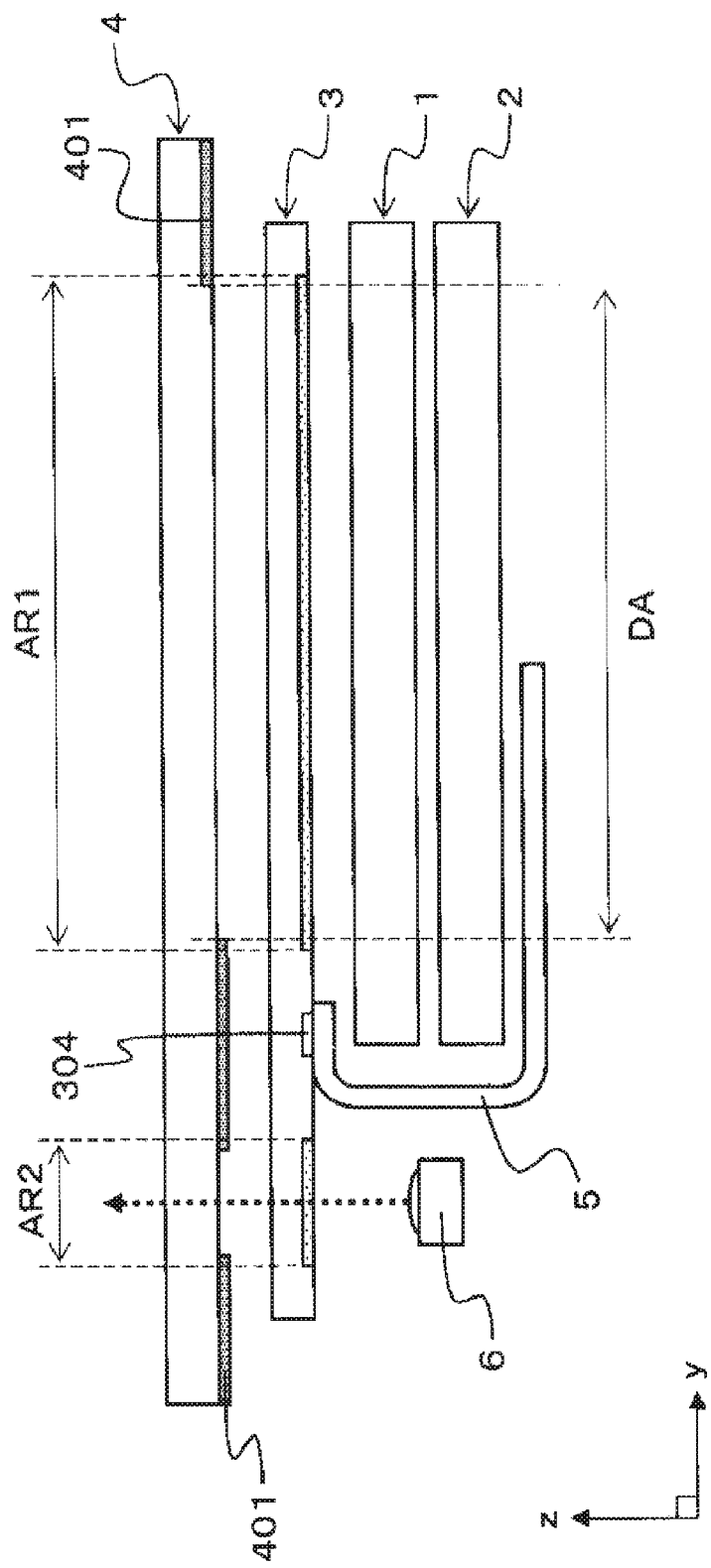
FIG. 5 is a schematic side view of the display device with the touch panel of the second embodiment.

FIGS. 4 and 5 are schematic views showing a schematic configuration of a display device with a touch panel of a second embodiment according to the invention.

FIG. 4 is a schematic plan view showing an example of a planar configuration of the touch panel in the display device with the touch panel of the second embodiment. FIG. 5 is a schematic side view of the display device with the touch panel of the second embodiment.

FIG. 4 shows the plan view along the xy plane in the xyz orthogonal coordinate system shown in FIG. 1. FIG. 5 shows the side view along the yz plane in the xyz orthogonal coordinate system shown in FIG. 1.

Also in the second embodiment, a liquid crystal display device having a touch panel disposed therein is taken as an example of a display device with a touch panel according to the invention. In this case, the display device has, for example as shown in FIG. 1, the liquid crystal display panel 1, the backlight 2, the touch panel 3, and the front window 4.

The display device of the second embodiment differs from that of the first embodiment in the configuration of the touch panel 3. Therefore, in the second embodiment, only the configuration of the touch panel 3 will be described.

In the touch panel 3 of the second embodiment as shown in FIG. 4, the external connection terminals 304 are disposed in the non-detection area located between the first detection area AR1 and the second detection area AR2. In this case, since it is sufficient that the planar shape and arrangement rule of the electrodes in each of the first detection area AR1 and the second detection area AR2 are those as described in the first embodiment, the description is omitted in the second embodiment.

Also in this case, the second electrode 302 in the first detection area AR1 and the second electrode 302 in the second detection area AR2 serve as a common electrode in which they are electrically connected through one external connection terminal 304. Moreover, it is so configured that the first electrode 301 in the second detection area AR2 is independent of the first electrode 301 in the first detection area AR1, whereby electric signals are input and output from different external connection terminals 304.

When the touch panel 3 as described above is used, it is necessary, for example as shown in FIG. 5, to overlay the touch panel 3 such that the surface thereof on which the external connection terminals 304 are disposed faces the liquid crystal display panel 1. In this case, when it is assumed that the first electrode 301, the second electrode 302, and the external connection terminal 304 are stacked on the same surface of a substrate in the touch panel 3, the first electrode 301 and the second electrode 302 are located between the substrate in the touch panel 3 and the liquid crystal display panel 1. Accordingly in this case, for example, the stacking order of a conductive layer for shielding disposed on the substrate in the touch panel 3 and the first and second electrodes 301 and 302 is reversed from that of the touch panel 3 of the first embodiment.

Moreover in the case of the touch panel 3 of the second embodiment, the external connection terminal 304 can be disposed on the opposite surface (rear surface) from that on which the first electrode 301 and the second electrode 302 are stacked by, for example, using a method such as disposing a through-hole in the substrate. In this case, the stacking order of the conductive layer for shielding disposed on the substrate in the touch panel 3 and the first and second electrodes 301 and 302 may be the same as that of the touch panel 3 of the first embodiment.

In the case of the touch panel 3 of the second embodiment, the second detection area AR2 for operation buttons can be disposed at a position not overlapping the liquid crystal display panel 1 as shown in FIG. 5 for example. In this case, when a light source 6, such as an LED, is arranged on the rear side of the second detection area AR2 as viewed from the viewer, the second detection area AR2 (operation buttons) can shine, and therefore, for example, the positions of the buttons are easily recognized.

Accordingly, also when the display device with the touch panel of the second embodiment is incorporated into electronic equipment, it is possible to achieve compatibility between the simplicity of the configuration or control of the electronic equipment and the maintaining of its high operability.

Moreover, the display device with the touch panel of the second embodiment can suppress a reduction in general versatility when being incorporated into electronic equipment.

Third Embodiment

Figure 6:
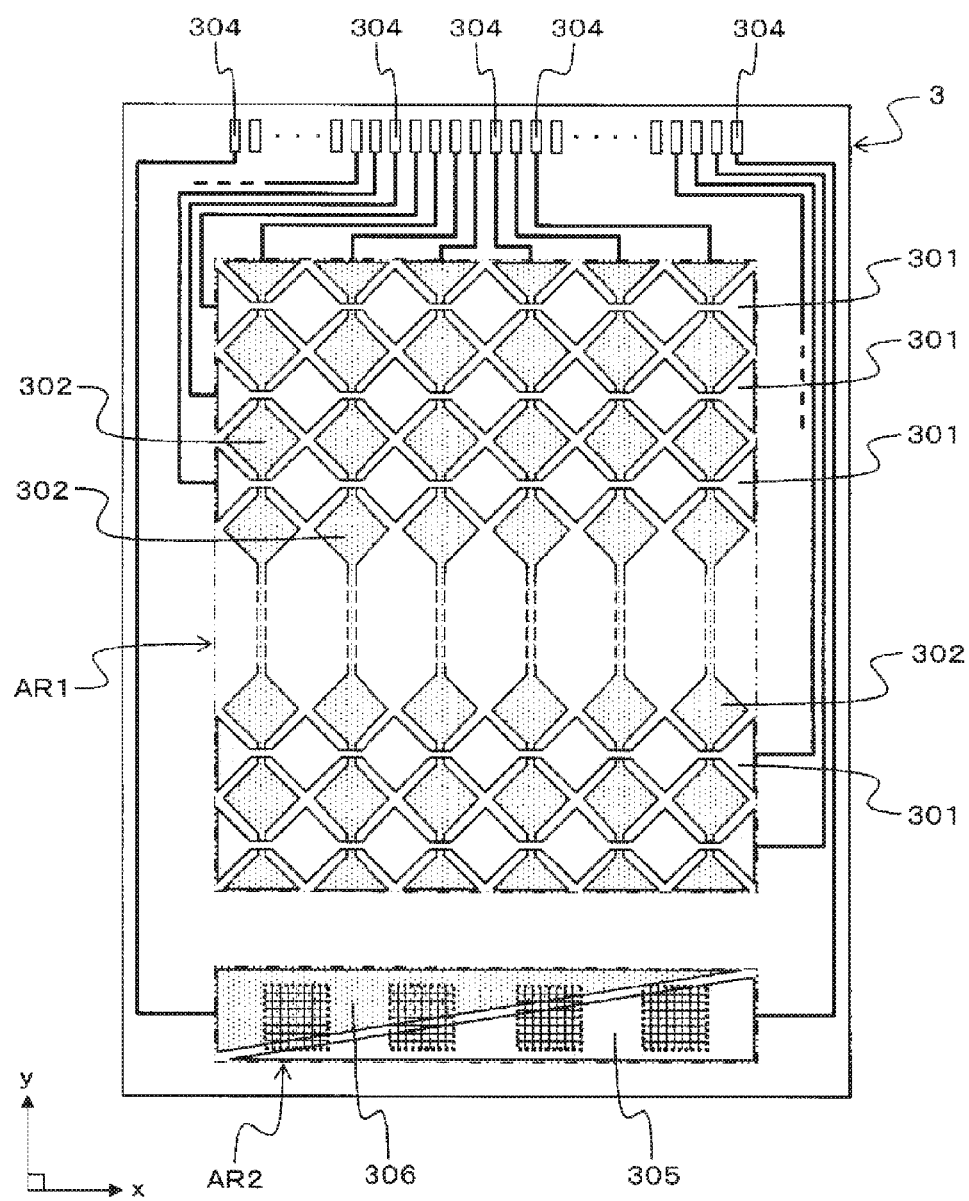
FIG. 6 is a schematic plan view showing an example of a touch panel in a display device with a touch panel of a third embodiment according to the invention.

FIG. 6 is a schematic plan view showing an example of a touch panel in a display device with a touch panel of a third embodiment according to the invention.

FIG. 6 shows a plan view along the xy plane in the xyz orthogonal coordinate system shown in FIG. 1.

The first and second embodiments describe, as an example, the case where the planar shape and arrangement rule of the electrodes in the first detection area AR1 are the same as those of the second detection area AR2. However, when the second detection area AR2 is used for operation buttons, it is sufficient that the presence or absence of touch to an area to be used as an operation button can be detected in the second detection area AR2. Therefore, when the second detection area AR2 is used for operation buttons, the detection accuracy required for the second detection area AR2 is relatively low. Accordingly, when the second detection area AR2 is used for operation buttons, electrodes to be disposed in the second detection area AR2 may be, for example as shown in FIG. 6, a pair of triangular electrodes 305 and 306. Since the detection method using such a pair of triangular electrodes 305 and 306 has been well known, a description of a specific configuration or detection principle of the second detection area AR2 is omitted in the specification.

When the planar shape and arrangement rule of the electrodes are different between the first detection area AR1 and the second detection area AR2 like the touch panel 3 of the third embodiment, both the first electrode 305 and the second electrode 306 in the second detection area AR2 are independent of the first electrode 301 and the second electrode 302 in the first detection area AR1.

Moreover, when the touch panel 3 of the third embodiment is used, for example, an IC (Integrated Circuit) used for the derivation of the coordinates of a touch position detects the presence or absence of touch while alternately switching the detection in a short time between the first detection area AR1 and the second detection area AR2.

Accordingly, also when the display device with the touch panel of the third embodiment is incorporated into electronic equipment, it is possible to achieve compatibility between the simplicity of the configuration or control of the electronic equipment and the maintaining of its high operability.

Moreover, in the display device with the touch panel of the third embodiment, it is possible to suppress a reduction in general versatility when being incorporated into electronic equipment.

When the shape of the electrode of the second detection area AR2 to be disposed for operation buttons is triangular like the touch panel 3 of the third embodiment, the electrode can be reduced in size compared to the electrode composed of the rhombus-shaped electrode portion and the triangle-shaped electrode portion as described in the first embodiment and the second embodiment. Therefore, the touch panel 3 of the third embodiment can reduce its outer dimensions compared to the touch panel 3 of the first embodiment or the second embodiment.

Although a detailed description is omitted, it is of course apparent that, also in the touch panel 3 of the third embodiment, the positional relation between the first detection area AR1 and the second detection area AR2, and the position, planar shape, number, and the like of the second detection area AR2 can be appropriately changed. Further, also the position of the external connection terminal 304 can be appropriately changed, and it is of course apparent that the external connection terminal 304 may be arranged between the first detection area AR1 and the second detection area AR2 as shown in the second embodiment (FIG. 4).

While the invention has been specifically described so far based on the embodiments, the invention is not limited to the embodiments. It is of course apparent that the invention can be variously modified within a range not departing from the gist thereof.

For example, in the embodiments, the case where the touch panel 3 is combined with a liquid crystal display device (the liquid crystal display panel 1) has been described as an example of a display device with a touch panel according to the invention. However, the invention is not limited to that. It is of course apparent that the invention may be one obtained by, for example, combining the touch panel with a self-emitting display device using an organic EL (Electro Luminescence) material.

Moreover in the embodiment, an electrostatic capacitive coupling system has been described as an example of the detection system of a touch position in the touch panel 3. However, the detection system of a touch position is not limited to that. It is of course apparent that the detection system may be another system.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
    a display area;
    a position detection area overlapped with the display area and including a plurality of first detection electrodes;
    a button detection area including a first button electrode and a second button electrode; and
    a non-detection area provided between the position detection area and the button detection area, and including a plurality of wirings;
    wherein
    the position detection area in which a touch position can be detected by detecting a capacitance of the first detection electrode corresponding to the touch position,
    the button detection area in which a touch presence can be detected by detecting a capacitance between the first button electrode and the second button electrode,
    the first button electrode electrically connects with a first wiring of the plurality of wirings,
    the second button electrode electrically connects with a second wiring of the plurality of wirings, and
    the first button electrode and the second button electrode are not overlapped each other.

2. The display device according to claim 1, wherein
    the first button electrode is provided at an end of the first wiring, and
    the second button electrode is provided at an end of the second wiring.

3. The display device according to claim 1,
    further comprising a plurality of connecting terminals, wherein
    the plurality of connecting terminals are arranged along a side edge of the display area,
    the plurality of connecting terminal are electrically connected with the plurality of wirings each other.

4. The display device according to claim 3, wherein
    the position detection area provided between the non-detection area and the plurality of connecting terminals.

5. The display device according to claim 1,
    further comprising a shielding layer, wherein
    the shielding layer overlaps the non-detection area.

6. The display device according to claim 5, wherein
    the shielding layer has a first opening and a second opening,
    the first opening overlaps the position detection area, and
    the second opening overlaps the button detection area.

7. A display device comprising:
    a display area;
    a light shielding area surrounding the display area;
    a first detection area overlapped with the display area and including a plurality of detection electrodes;
    a second detection area including a first electrode and second electrode;
    a non-detection area including a first wiring, a second wiring, and a third wiring; and
    a plurality of terminals arranged along a first side edge of the display area, and including a first terminal, a second terminal, and third terminal,
    wherein
    the first detection area in which a touch position can be detected by detecting a capacitance of the detection electrode corresponding to the touch position,
    the second detection area in which a touch presence can be detected by detecting a capacitance of the first electrode and the second electrode,
    the non-detection area is overlapped with the light shielding area,
    the plurality of the detection electrodes are electrically connected with the first wiring,
    the first electrode is electrically connected with the second wiring and provided at an end of the second wiring,
    the second electrode is electrically connected with the third wiring and provided at an end of the third wiring,
    the plurality of the detection electrodes are electrically connected with the first terminal by the first wiring,
    the first electrode is electrically connected with the second terminal by the second wiring, and
    the second electrode is electrically connected with the third terminal by the third wiring.

8. The display device according to claim 7, wherein
    the shielding area has a first opening and a second opening,
    the first opening overlaps the first detection area, and
    the second opening overlaps the second detection area.

9. The display device according to claim 8, wherein
    the shielding area overlaps with the plurality of terminals.

* * * * *